(12) United States Patent
Hamman (10) Patent No.: US 7,013,639 B2
(45) Date of Patent: Mar. 21, 2006

(54) HEAT DIFFERENTIAL POWER SYSTEM

(75) Inventor: Brian A Hamman, Krugerville, TX (US)

(73) Assignee: QNK Cooling Systems Inc., Krugerville, TX (US)

( * ) Notice: Subject to any disclaimer, the term of this patent is extended or adjusted under 35 U.S.C. 154(b) by 0 days.

(21) Appl. No.: 11/017,024

(22) Filed: Dec. 20, 2004

(65) Prior Publication Data
US 2005/0138925 A1   Jun. 30, 2005

Related U.S. Application Data

(60) Provisional application No. 60/533,363, filed on Dec. 29, 2003.

(51) Int. Cl.
*F02B 1/00*   (2006.01)
*F28F 1/00*   (2006.01)

(52) U.S. Cl. .............................. 60/508; 60/517; 60/520; 60/645; 60/650; 60/682

(58) Field of Classification Search ................. 60/508, 60/516, 517, 518, 519, 520, 521, 522, 523, 60/524, 525, 526, 645, 650, 682
See application file for complete search history.

(56) References Cited

U.S. PATENT DOCUMENTS

| | | | | |
|---|---|---|---|---|
| 4,488,402 A | * | 12/1984 | Sieck | 60/517 |
| 4,815,290 A | * | 3/1989 | Dunstan | 60/517 |
| 5,406,801 A | * | 4/1995 | Inoue et al. | 60/520 |

* cited by examiner

*Primary Examiner*—Sheldon J Richter
(74) *Attorney, Agent, or Firm*—Patent Dominion LP (57) ABSTRACT

Heat differential power systems and apparatus for powering liquid cooling systems and/or generating electrical power in a data processing system or a telecommunication system are presented. A number of embodiments are presented. In each embodiment a heat differential power system is implemented which utilizes the heat created a heat-generating component such as a microprocessor within the data processing or telecommunications system and the resulting heat differential created with other parts of the system as power to operate the heat differential power system and convert thermal energy into mechanical and/or electrical energy for powering a liquid cooling system, fans, other electrical components, and/or extending the battery life in a portable data processing or telecommunications system.

8 Claims, 7 Drawing Sheets

HEAT DIFFERENTIAL POWER SYSTEM

BACKGROUND OF THE INVENTION

CROSS REFERENCE TO RELATED APPLICATIONS

The present application is a completed application replacing U.S. Provisional Patent Application Ser. No. 60/533,363, filed Dec. 29, 2003, entitled "Stirling Powered Liquid Cooling System" and which is herein incorporated by reference. The priority date of application 60/533,363 is claimed. Reference is made also to pending U.S. patent application Ser. No. 10/666,189 filed Sep. 10, 2003 for a detailed description of a liquid cooling system and its operation.

DESCRIPTION OF THE RELATED ART

Portable computing and telecommunication devices are increasingly being used. At the heart of these devices are processors and other heat-generating components which are becoming increasingly more powerful and which, as a result, are requiring more power to operate and generating more heat in operation.

More sophisticated and powerful methods for cooling these heat generating components is required such as liquid cooling. Liquid cooling however does require some additional power to operate.

When these devices are used in portable mode, there is an ever increasing demand on the battery for power, which in turn shortens the battery life. Moreover, in portability mode, these devices are often at rest on a person's lap or in close contact with other parts of the body and it is not desirable to have increasing amounts of heat in such close contact with the human body.

An additional environmental problem is that the increasing amounts of heat generated by these heat generating components results in additional amounts of wasted energy.

The additional heat being generated by these heat-generating components has other detrimental effects. For example, it can cause component malfunctions or shutdowns and lower the useful life of the components themselves and the device as a whole.

Heat differential power sources or engines such as the Sterling engine have been known and available for some time. They operate on the principal that thermal energy can be converted to other forms of energy such as mechanical or electrical energy and make use of a difference in temperature between two or more points, areas or locations to make this conversion.

Thus, there is a need in the art for a method and apparatus for cooling these data processing and telecommunication systems. There is a need in the art for a method and apparatus for powering these cooling systems, particularly in portability mode. There is a need in the art for a method or apparatus for extending the battery life and thus the operational time of these devices in portability mode. There is a need in the art for a method or apparatus to conserve or utilize wasted thermal energy. There is a need in the art for a method or apparatus used to cool the heat generating components, conserve and utilize the thermal energy and/or to extend the battery life which can be deployed within the small footprint available in the case or housing of a computing system, such as a laptop computer, standalone computer, cellular telephone, etc used to dissipate processor heat which can be deployed within the small footprint available in the case or housing of a computing system, such as a laptop computer, standalone computer, cellular telephone, etc There is a need in the art for an optimal, cost-effective method and apparatus for cooling heat generating components which allows the processor or other heat-generating component to operate at the marketed operating capacity, and which is effective in portability mode for the device or system.

SUMMARY OF THE INVENTION

A method and apparatus for generating power within an electronic system using a heat differential power system which converts heat differential created by a heat generating component into power to be used by the electronic system. A variety of heat differential power systems are implemented.

A heat differential power system comprising a heat collector thermally connected to one or more heat generating components, a housing containing air or gas and having one side thermally connected to the heat collector and another side thermally connected to a cooler device or temperature source; a piston disposed within the housing alternately moving the air or gas toward the side thermally connected to the heat collector and the side thermally connected to the cooler device or temperature source and causing the air or gas to expand as it nears the side thermally connected to the heat collector and contract as it nears the side thermally connected to the cooler device or temperature source; a second piston disposed in a sealed cavity atmospherically connected to the air or gas within the housing and responding to the expansions and contractions of the air or gas; a rotating shaft mechanically connected to both pistons which receives the mechanical motions of the second piston and powers the movement of the first piston; and one or more flywheels connected to the rotating shaft for powering other devices and/or generating electrical power to be used by electrical devices.

A method and apparatus for generating power within an electronic system using a heat differential power system to power an impeller in a pump to propel the flow of liquid in a liquid cooling system disposed with the electronic system.

A method and apparatus for generating power within an electronic system using a heat differential power system and on which magnets and induction coils are disposed thereon such that the magnets rotate and pass within close proximity of the induction coils to generate electrical power to be used by the electronic system A method and apparatus for generating power within an electronic system using a heat differential power system and on which magnets and induction coils are disposed thereon such that the relative movement of magnets to pass within close proximity of the induction coils generates electrical power to be used by the electronic system and to power an impeller in a pump to propel the flow of liquid in a liquid cooling system disposed with the electronic system.

A portable data processing system employing a method and apparatus for generating power within the system using a heat differential power system which converts a temperature difference created by a heat generating component into power to be used by the electronic system.

A data processing system employing a method and apparatus for generating power within the system using a heat differential power system which converts a temperature difference created by a heat generating component into power to be used by the electronic system.

A telecommunications system employing a method and apparatus for generating power within the system using a heat differential power system which converts a temperature difference created by a heat generating component into power to be used by the electronic system.

A liquid cooling system having one or more heat transfer systems liquidly connected in series and/or in parallel for receiving cooled liquid, absorbing heat into the liquid from a heat generating component and expelling the heated liquid; a heat exchanger for receiving the heated liquid from the heat transfer systems and cooling the liquid to be transported back to the heat transfer systems; and a heat differential power system for powering the circulation of the liquid between the heat exchange system and the heat transfer systems and/or generating additional electrical power for use by an electrical system or device.

In another embodiment, a liquid cooling system having a heat differential power system comprising a heat collector thermally connected to one or more heat generating components; a housing containing air or gas and having one side thermally connected to the heat collector and another side thermally connected to a cooler device or temperature source; a piston disposed within the housing alternately moving the air or gas toward the side thermally connected to the heat collector and the side thermally connected to the cooler device or temperature source and causing the air or gas to expand as it nears the side thermally connected to the heat collector and contract as it nears the side thermally connected to the cooler device or temperature source; a second piston disposed in a sealed cavity atmospherically connected to the air or gas within the housing and responding to the expansions and contractions of the air or gas; a rotating shaft mechanically connected to both pistons which receives the mechanical motions of the second piston and powers the movement of the first piston; and one or more flywheels connected to the rotating shaft for powering other devices and/or generating electrical power to be used by electrical devices.

In another embodiment, a portable data processing system or telecommunications system having a liquid cooling system powered by a heat differential power system.

In yet another embodiment, a data processing system or telecommunications system having one or more liquid cooling systems powered by a heat differential power system.

DETAILED DESCRIPTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the invention.

It should be understood that the principles and applications disclosed herein can be applied in a wide range of data processing systems and telecommunication systems. In the present invention the heat produced by a data processing unit such as a microprocessor partially or entirely powers a liquid cooling system attached thereto. Liquid cooling solves performance and reliability problems associated with heating of various data processing components. The present invention may be utilized in a number of computing, communications, and personal convenience applications. For example, the present invention could be implemented in a variety of personal computers which are portable or stationary, cell phones, and personal digital assistants (PDAs). The present invention is equally applicable to a number of heat-generating components (e.g., central processing units or digital signal processors) within such systems. For purposes of explanation and illustration, the present invention is hereafter described primarily in reference to a central processing unit (CPU) within a portable personal computer such as a laptop.

Figure 1:
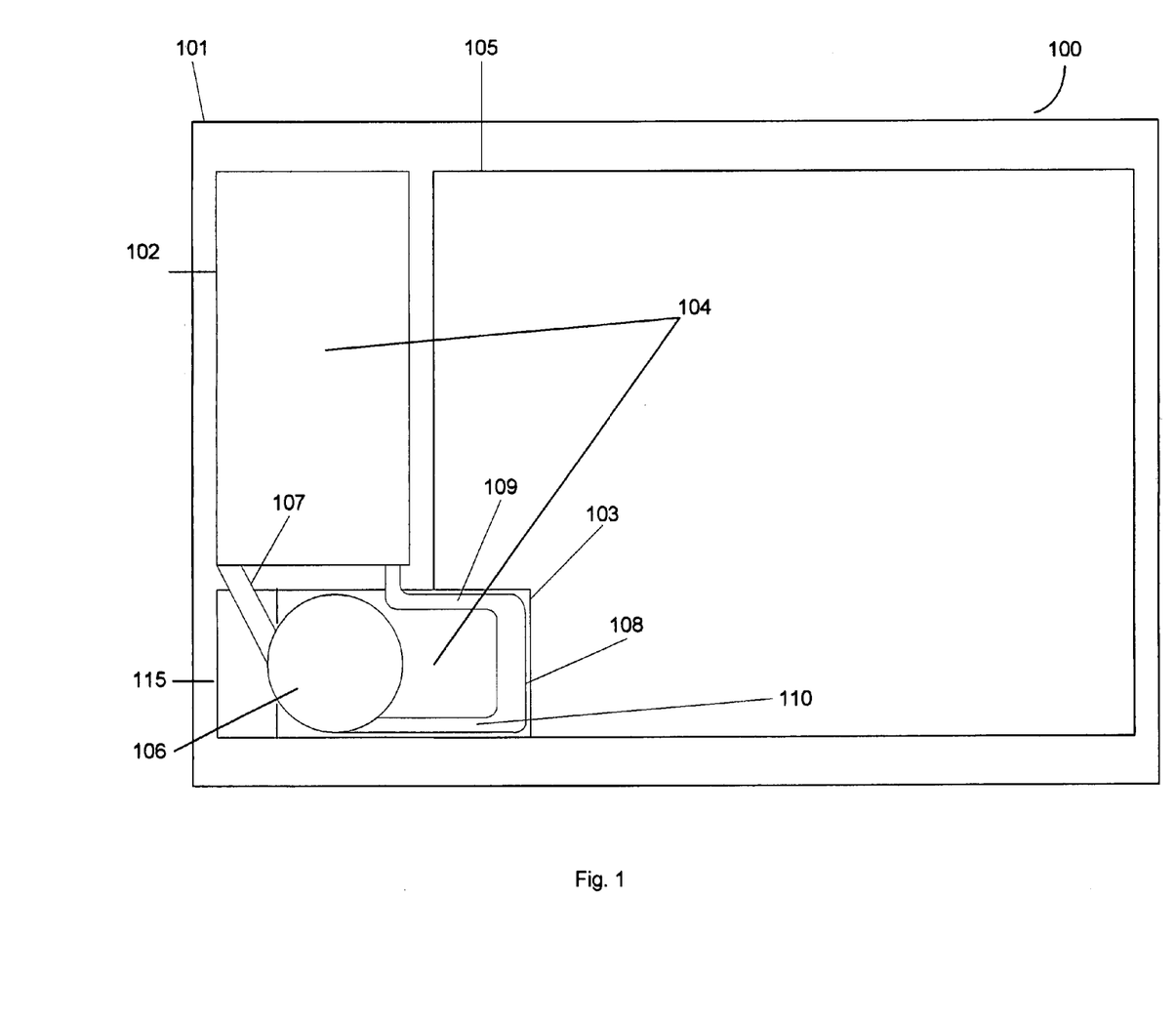
FIG. 1 displays a system view of a liquid cooling system disposed in a data processing system housing and implemented in accordance with the teachings of the present invention.
Figure 2:
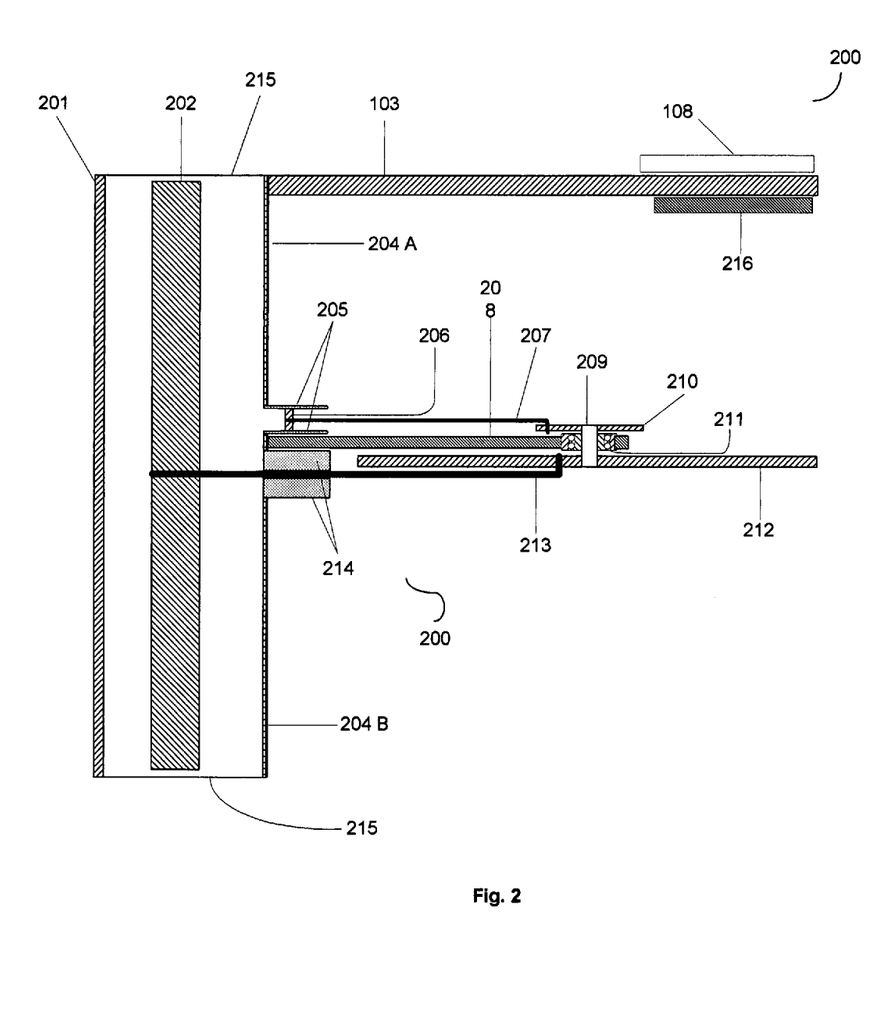
FIG. 2 displays a sectional view of a heat differential power system disposed within a data processing system and implemented in accordance with the teachings of the present invention.
Figure 5:
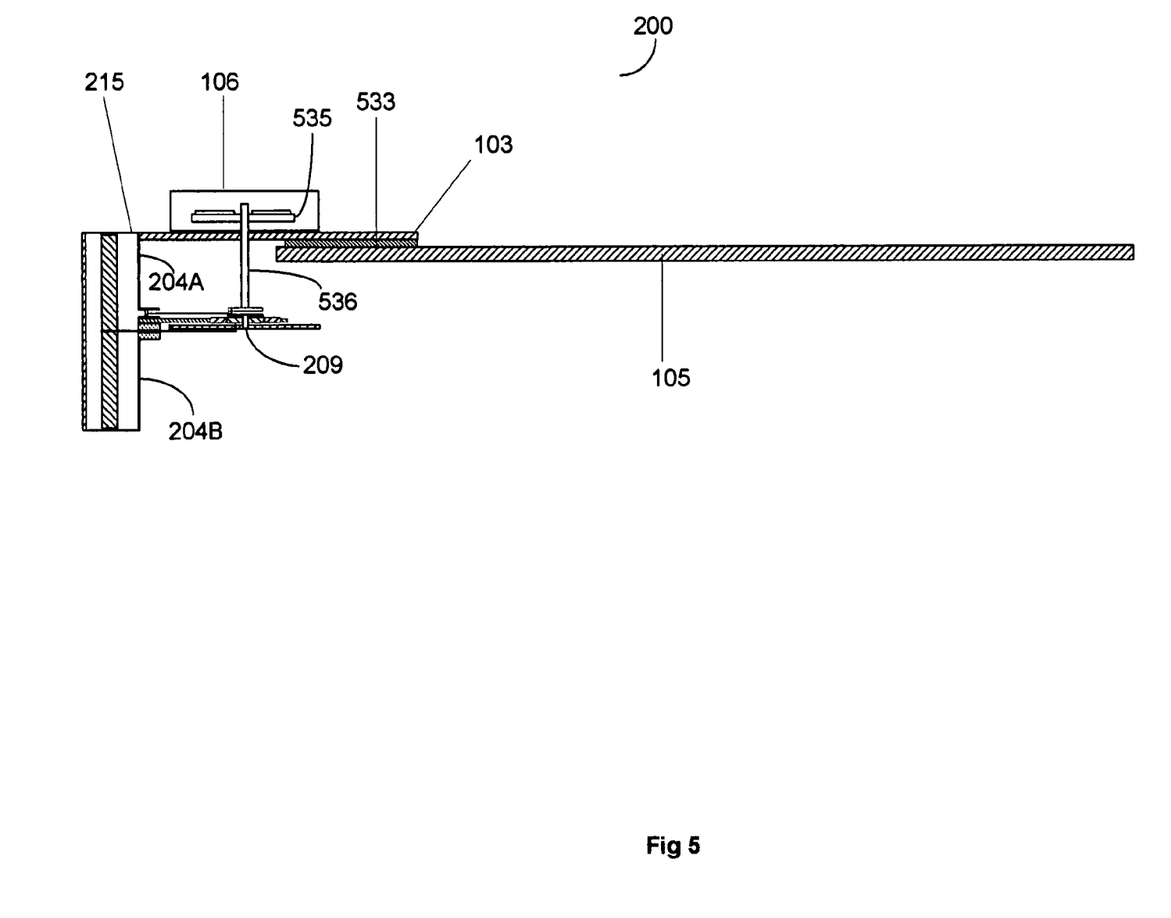
FIG. 5 displays a sectional view of a heat differential power system disposed within a data processing system and connected to a pump of a liquid cooling system and implemented in accordance with the teachings of the present invention.

Referring now to FIG. 1, a data processing system 100 is depicted with a liquid cooling system 104 powered by a heat differential power system 200 according to the present invention. The data processing system 100, shown in part only in FIG. 1, comprises a housing 101 such as a computer cabinet or case, a main circuit board 105 such as a motherboard, and one or more heat generating component(s) such as a microprocessor which are not depicted in FIG. 1 but which are in direct contact with a heat collector 103. The heat generating component(s) such as the microprocessor data processing is depicted in FIGS. 2, and 5.

The liquid cooling system 104 comprises a heat exchanger 102, one or more heat transfer units 108, a pump 106, liquid conduits 107 and 109, and 110. The heat differential power system 200, shown in greater detail in subsequent FIGS. 2–6 is disposed in the data processing system 100 such that the casing 101 serves as its cold temperature point and the heat collector 108 serves as its hot temperature point. The heat differential power system is also disposed such that its rotating shaft is connected to the pump 106 to assist the flow of liquid through the liquid cooling system 104. It should be appreciated that means other than a rotating shaft can be used to drive the pump 106 to better suite a particular application.

In the liquid cooling system 104, the pump 106 propels the flow of coolant into conduit 110. The coolant is delivered through conduit 110 to heat transfer system 108. The heat transfer system 108 is connected to the heat collector 103 in a manner so as to form a cavity through which the coolant can flow. The heat collector 103 is disposed within the data processing system in such a manner so that it is in direct thermal contact with the heat generating components (e.g. micro-processors in the data processing system 100). As the coolant passes through the heat transfer system 108, heat generated by the heat generating components is transferred through heat collector 103 to the hot side of the temperature differential power system and also adsorbed by the coolant flowing through heat transfer system 108. The heat collector 103 can be made of any suitable heat conducting material such as copper. The heat generating component(s) are thereby cooled by the rapid transfer and absorption of heat.

The coolant which has now been warmed by the transfer of heat from the heat generating component(s) exits the heat transfer system 108 and is delivered to the heat exchanger system 102 via conduit 109. The heat exchanger system 102 is an air to liquid heat exchanger that cools the heated coolant. The cooled liquid coolant is delivered to the pump 106 via conduit 107 which then delivers and propels the cooled coolant into conduit 110. The cycle is then repeated continuously during data processing system operation. The coolant flow forms a complete loop which constantly circulates the coolant, which extracts and dissipates the heat from one or more data processing units.

In a data processing system 100 having more than one heat generating components to be cooled, the heat transfer system 108 can be constructed in multiple ways. For example, one housing may be used to connect to the heat collector such that one chamber is formed that traverses the entire length of heat collector 103 that is direct contact with all of the heat generating components to be cooled. Alternatively, several chambers can be fabricated with the heat collector 103 and interconnected by conduits to transport the coolant and arranged to cool the heat generating components serially or in parallel depending on the cooling requirements of the data processing system. In any case, what is required is an arrangement whereby the coolant is allowed to come into immediate proximity of each heat generating component to be cooled.

The heat exchanger 102 depending upon a particular application may further comprise one or more fans within the data processing system 100 to effect desired heat transfer. The heat exchanger 102, depending upon a particular application, may also be constructed to utilize convection to dissipate heat.

The heat differential power system 200, such as a Stirling engine, uses thermal differentials to operate. This heat differential power system 200 is depicted in FIGS. 2–6. In FIG. 1, the heat differential power system 200 acquires the thermal energy to operate through the heat collector 103. The pump 106 is powered by and coupled directly to the heat differential power system 200. The attachment of the pump 106 to the heat differential power system 200 can be accomplished in a variety of ways to suite each specific application. This attachment would be obvious to one skilled in the art. The heat differential power system may comprise a Sterling engine or the like.

FIG. 2 is a cutaway frontal view of a heat differential power system according to the present invention. The heat differential power system 200 operates when there exists a thermal differential (temperature difference) from one side 201 of the power system 200 to the other side 204. Very small differentials are needed to start and operate the engine. A very precisely made small power system 200 could operate from the heat emitted by one's hands at normal room temperature. As the thermal differentials become greater, the power system 200 produces more power, which in turn causes the power system 200 to operate at higher RPM's.

The power system 200 includes a sealed housing 215 having a hot side 204A and 204B and a cold side 201. The hot side 204A and 204B are thermally connected to the heat collector 103. The cold side 201 is thermally connected to the data processing system casing 101, shown in FIG. 1. It should be noted that the cold and hot sides may be thermally connected to other points in the data processing system or telecommunication system so long as there is a temperature differential. It is preferred, however, to have these thermal connections to points where there is sufficient temperature differential to generate the desired power from the power system 200.

A piston 202 moves back and forth toward the hot side 204A and 204B and cold side 201 of the housing. As the piston moves toward the cold side 201, it displaces the air or gas inside the housing 215 toward the hot side 204A and 204B which causes the air or gas to expand. As the piston 202 moves toward the hot side 204A and 204B, it displaces the air or gas in the housing 215 toward the cold side 201 which cause the air or gas to contract. The expansion of the air or gas pushes piston 206 away (or outward) from the housing. The contraction of the air or gas, on the other hand, creates a vacuum like pulse which pulls piston 206 toward (or inward) the housing 215.

Piston 202 is not sealed in the chamber 215, which allows air to be displaced from the cold side 201 to the hot side 204A and 204B and vice versa.

Piston 206 is sealed in the bore of chamber 205 by a precision fit. The chamber 205 should be of and appropriate size and shape to fit the particular application and is shown in the figures as a cylinder. Sealing rings may also be used to seal piston 206 in the bore of the chamber 205. The inward and outward motion of the piston 206 is converted to rotating motion by connecting a rod 207 to a crankshaft disc 210. The crankshaft disc 210 is connected to a crankshaft 209. The crankshaft 209 is connected to a flywheel 212, which rotates and moves a connecting rod 213 in and out. The connecting rod 213 is connected to piston 202 causing it to move alternately toward and away from the hot side 204A and 204B and the cold side 201 in the housing 215. The connections of rod 207 to disc 210 and rod 213 to flywheel 212, respectively, are made so as to insure the correct timing of pistons 206 and 202, respectively.

The heat collector 103 transfers heat to side 204 A&B of housing 215 which creates the hot side. The side 201 of housing 215 may be a plate or other suitable device which is in thermal contact with the casing 101 of the data processing system 100 shown in FIG. 1 and thus form the cold side of the housing 215.

Bearing Support 208 is a post or other suitable shape that holds a bearing 211 that supports the rotating crankshaft 209. Bearing block 214 supports and atmospherically seals the connecting rod 213 as it cycles in and out of the housing 215 and drives piston 202 back and forth within the housing 215. It is important to note that connecting rods 207 and 213 during operation will have to bend or flex slightly during each cycle. This flexing can be accomplished by inserting a flexible joint, or by utilizing a sufficiently flexible material to construct connecting rods 207 and 213 as would be obvious to one skilled in the art.

Heat generating component 216 is a microprocessor disposed with the data processing system 100. One or more heat generating components 216 can be thermally connected to the heat collector 103. Heat generated by component(s) 216 is transferred to heat collector 103 and thermally coupled to the hot side 204A and 204B of the housing 215. A heat transfer system 108 is also shown in FIG. 2 and disposed on the heat collector 103 to form a chamber through which coolant may flow and located in close proximity to the heat-generating component 216.

Figure 3:
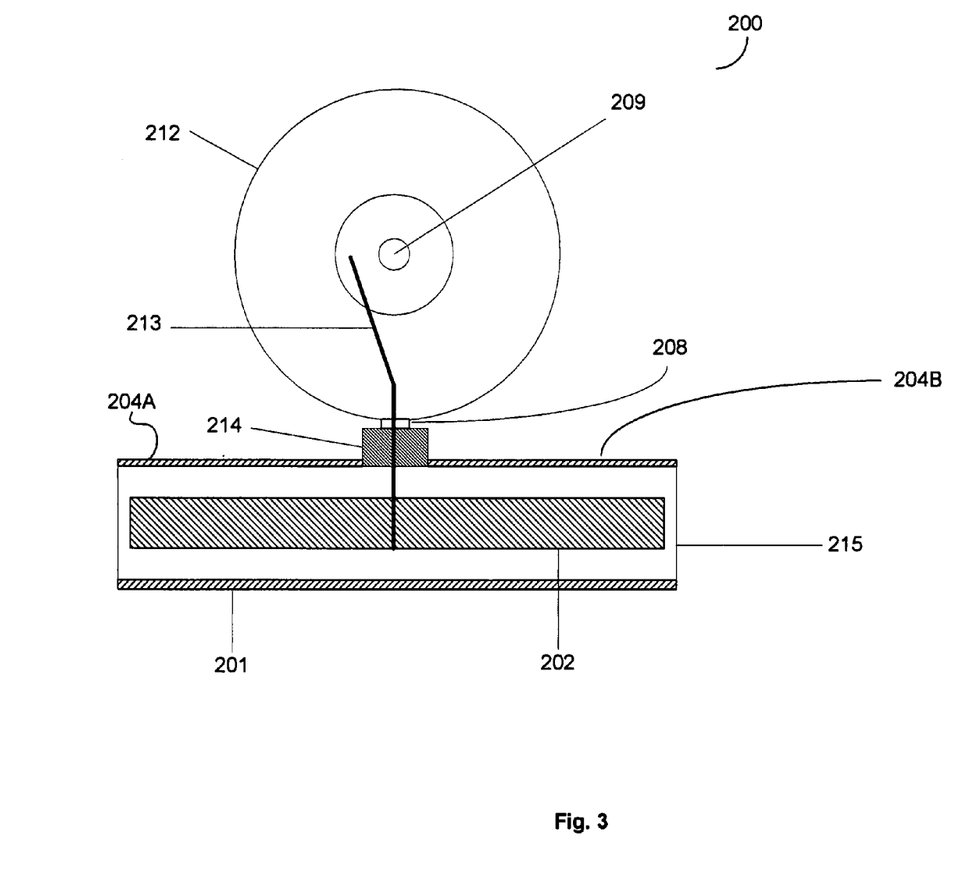
FIG. 3 displays yet another sectional view of a heat differential power system disposed within a data processing system and implemented in accordance with the teachings of the present invention.

FIG. 3 represents a view of the heat differential power system 200 in FIG. 2 from the flywheel 212 perspective. In FIG. 3, the heat differential power system 200 is shown. Also depicted is the cold side 201 of sealed housing 215; the hot side 204A and 204B of housing 215 and piston 202 for displacing the gas within the housing 215.

In FIG. 3, bearing support 208 is a post or other suitable shape that holds a bearing that supports the crankshaft 209. Flywheel 212 is connected to the crankshaft 209. Connecting rod 213 connects the flywheel 212 to the piston 202. Bearing block 214 supports and atmospherically seals housing 215 as the connecting rod 213 cycles in and out of the chamber 215.

Figure 4:
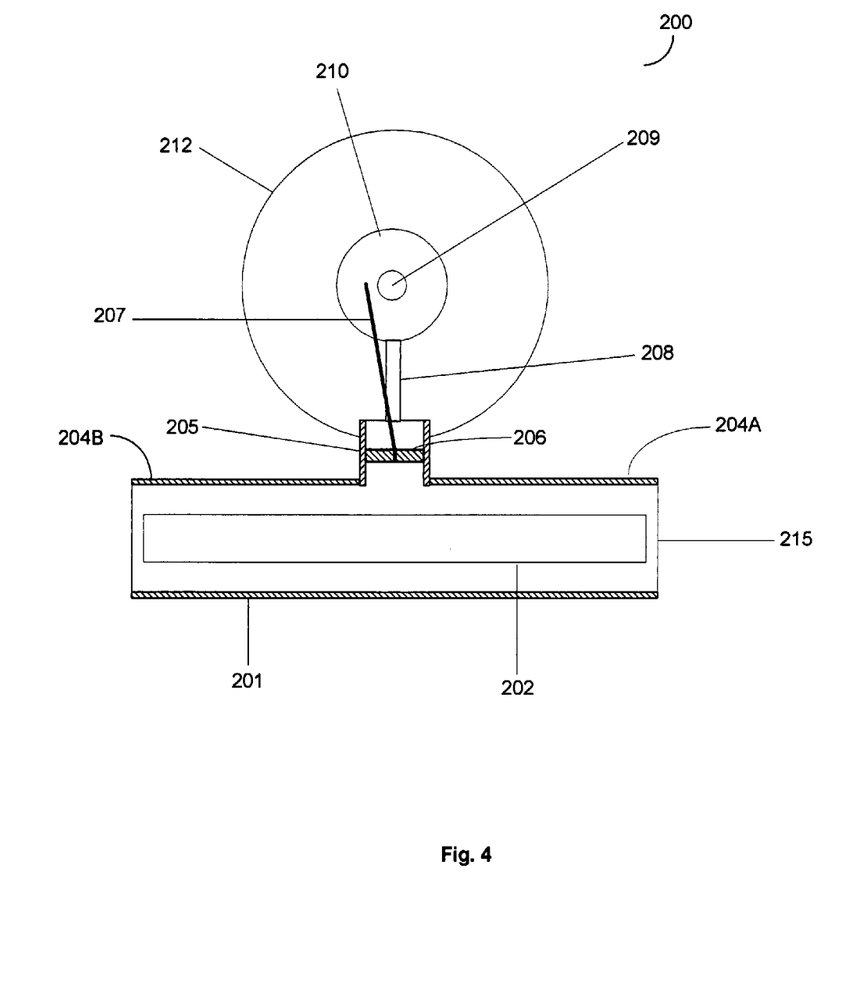
FIG. 4 displays yet another sectional view of a heat differential power system disposed within a data processing system and implemented in accordance with the teachings of the present invention.

FIG. 4 is a crankshaft 209 side view of the heat differential power system 200. In FIG. 4, the housing 215, the cold side 201, the hot side 204A and 204B, the piston 202, the bearing support 208, the crankshaft 209, the flywheel 212 are depicted similarly as in FIG. 3. In FIG. 4, piston 206 is also depicted as well as chamber 205 for atmospherically sealing piston 206 and housing 215, and connecting rod 207 for converting the inward and outward motion of piston 206 to rotating motion applied to crankshaft disc 210.

FIG. 5 depicts yet another view, similar to FIG. 2 of the heat differential power system 200. In FIG. 5, the main printed circuit board 105 of FIG. 1 such as the motherboard, with a heat generating component 216 such as a microprocessor, disposed thereon. The heat collector 103 disposed on the component 216 and thermally couples heat to the hot side 204A and 204B of the power system housing 215. Also depicted in FIG. 5 is the pump 106 of FIG. 1. Within the pump 106, an impeller 535 is disposed for circulating the liquid through the cooling system. A rotating connecting rod 536 is connected to the crankshaft 209 of the heat differential power system and also connected to the impeller 535 for rotating the impeller within the pump 106. It shall be understood that connecting rod 536 may be a separate piece connected to the crankshaft 209 or may be just an extension of the crankshaft 209.

Figure 6:
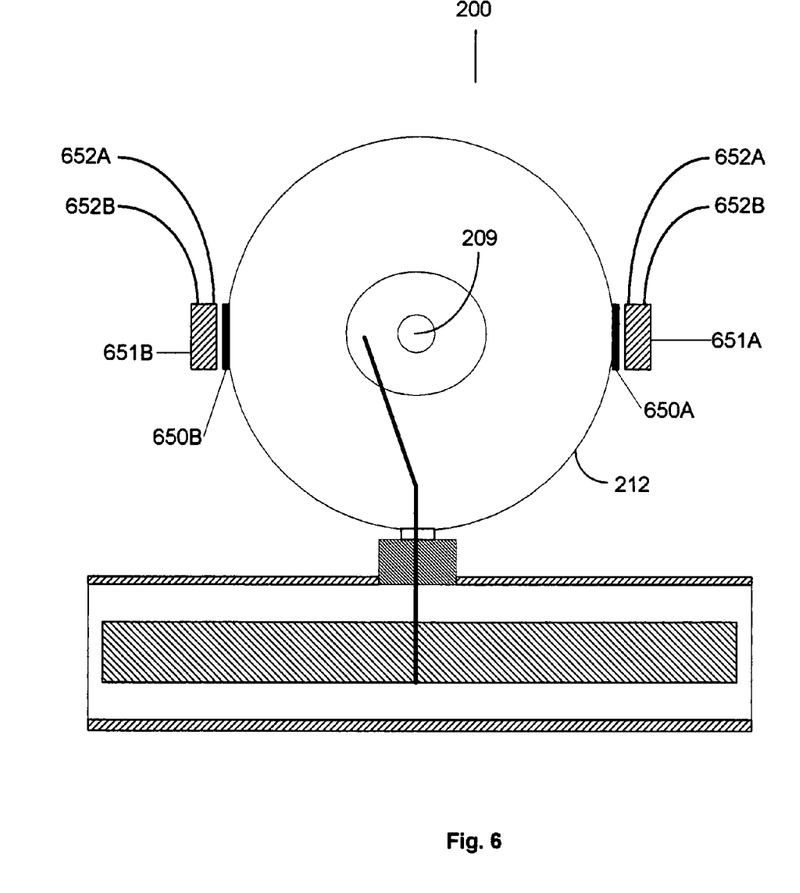
FIG. 6 displays a sectional view of a heat differential power system disposed within a data processing system having a flywheel with magnets disposed thereon and induction coils disposed in close proximity to the magnets as they rotate for generating electrical power and implemented in accordance with the teachings of the present invention.

FIG. 6 is a flywheel side view of the heat differential power system 200 as shown in FIG. 3. Magnets 650A and 650B are attached to the flywheel 212. Coils 651A and 651B are coils of wire that form a complete circuit, so that electrical flow can enter on one conductor 652A, then pass through a continuous coil of wire 651A and 651B, and then exit on the other conductor 652B in the pair, 652A and 652B depicting wires that form the ends of coils 651A and 652B. The magnets 650 rotate with the flywheel 212. As each magnet travels past the coil of wire 651, a small electrical power pulse is produced. It should be appreciated that multiple magnet and coil arrangements could be placed around any rotating component, and should not be limited to the two as depicted in FIG. 6. Similarly, it should be understood that flywheel 212 need not used be used for the magnet 650 and coil 651 assemblies, but that any device connected to the crankshaft 209 can be utilized.

Figure 7:
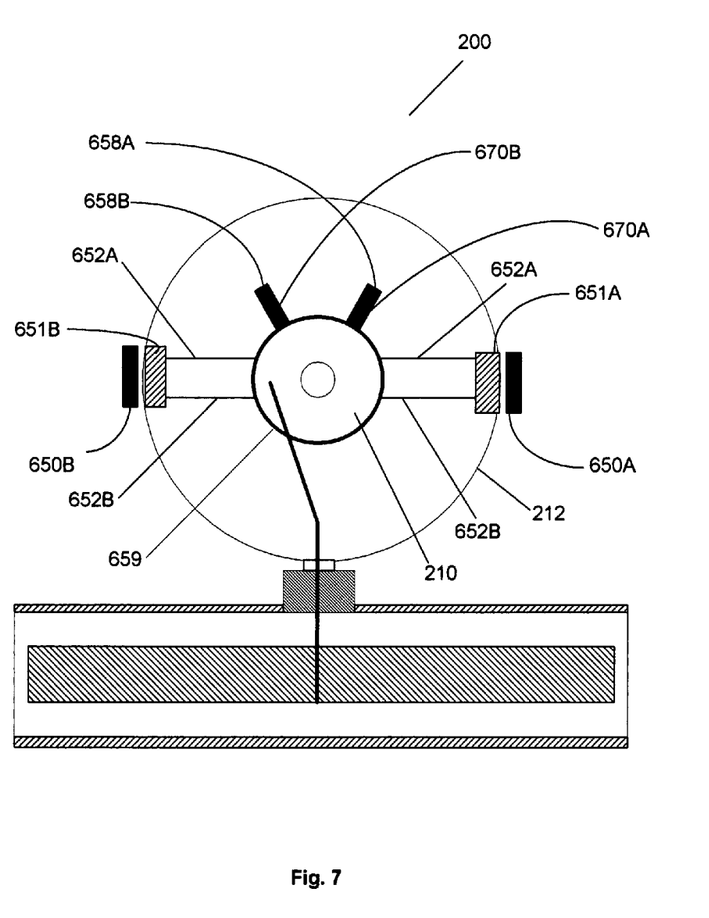
FIG. 7 displays a sectional view of a heat differential power system disposed within a data processing system having a flywheel with induction coils disposed thereon and magnets disposed in close proximity to the induction coils as they rotate for generating electrical power and implemented in accordance with the teachings of the present invention.

FIG. 7 is a flywheel side view of the heat differential power system 200 as shown in FIG. 3. Coils 651A and 651B are attached to the flywheel 212 for movement past stationary magnets 650A and 650B. The flywheel 212 is provided with a commutator surface 659 attached to the crankshaft disc 210 for passing generated electrical power from the rotating coils 651A and 651B, through electrical conductors 652A and 652B to the commutator 659. The electrical energy would is then passed through spring loaded brushes 670A and 670B and then exit to an electrical circuit through conductors 658A and 658B. The commutator 659 is attached to the outside diameter of the crankshaft disc 210. It should be appreciated that a wide variety of configurations could be used for the commutator arrangement to suite the particular design criteria. It is even contemplated that the flywheel could be replaced by a linear induction power generator with the magnets and coils arranged for relative linear movement with respect to one another. An advantage of such a power generating means is that it can be inserted into narrower spaces that a flywheel arrangement.

The arrangements of FIG. 6 and FIG. 7 can be utilized to reclaim a small amount of electrical energy from the heat differential power system 200 when the power system 200 is running at high speed. This reclamation and conversion of power is highly desirable in portable battery-operated systems to extend the time of operation of the portable system. Similarly, the electrical power generated by this arrangement could be used to help power one or more fans for cooling or dissipating heat from a heat exchanger, for powering an electric pump for a liquid cooling system and/or to be used by the data processing system as power. It should also be appreciated that like most power generating units with the proper placement of magnets and coils, the arrangements in FIG. 6 and FIG. 7 of the coils 651A and 651B in combination with the magnets 650A and 650B could act as motor to rotate the flywheel. It should be appreciated that this same configuration can be used as a brake to slow, hold, or stop the rotation of the flywheel if desired for a specific purpose.

Thus, the present invention has been described herein with reference to a particular embodiment for a particular application. Those having ordinary skill in the art and access to the present teachings will recognize additional modifications, applications, and embodiments within the scope thereof.

It is, therefore, intended by the appended claims to cover any and all such applications, modifications, and embodiments within the scope of the present invention.

What is claimed is:

1. A heat differential power system for an electronic system comprising:
    a heat collector coupled to one or more heat generating devices in the electronic system;
    a housing containing a gas and having a surface thermally connected to a point or area in the electronic system cooler than the one or more heat generating devices and having another surface thermally connected to the heat collector;
    a first piston disposed within the housing for alternately moving the gas toward the surfaces causing the gas to expand as it nears the surface thermally connected to the heat collector and to contract as it nears the surface thermally connected to the cooler point or area;
    a second piston disposed within or adjacent to the housing which responds to the alternate expansion and contraction of the gas for powering the first piston; and
    means connected to the pistons for receiving the mechanical motion of the second piston and providing the first piston with mechanical motion.

2. The heat differential power system of claim 1 wherein the gas is air.

3. A cooling system comprising:
one or more heat transfer systems receiving cooled liquid and expelling heated liquid produced by acquiring heat from one or more heat generating components;
 a heat exchanger system in fluid communication with the heat transfer systems, the heat exchange system receiving the heated liquid and producing the cooled liquid; and
 a heat differential power system for powering the circulation of liquid between the heat transfer systems and the heat exchange system.

4. A portable electronic system having one or more of the cooling systems as claimed in claim 3.

5. A data processing system having one or more of the cooling systems as claimed in claim 3.

6. A telecommunication system having one or more of the cooling systems as claimed in claim 3.

7. The cooling system of claim 3 in which the heat differential power system is comprised of:
 a heat collector coupled to one or more heat generating devices;
 a housing containing a gas and having a surface thermally connected to a point or area in the electronic system cooler than the one or more heat generating devices and having another surface thermally connected to the heat collector;
 a first piston disposed within the housing for alternately moving the gas toward the surfaces causing the gas to expand as it nears the surface thermally connected to the heat collector and to contract as it nears the surface thermally connected to the cooler point or area;
 a second piston disposed within or adjacent to the housing which responds to the alternate expansion and contraction of the gas for powering the first piston; and
 means connected to the pistons for receiving the mechanical motion of the second piston and providing the first piston with mechanical motion.

8. The cooling system of claim 7 wherein the gas is air.

* * * * *

UNITED STATES PATENT AND TRADEMARK OFFICE
CERTIFICATE OF CORRECTION

PATENT NO. : 7,013,639 B2 Page 1 of 1
APPLICATION NO. : 11/017024
DATED : March 21, 2006
INVENTOR(S) : Brian A. Hamman It is certified that error appears in the above-identified patent and that said Letters Patent is hereby corrected as shown below:

On the title page, item [73] should read:
The Assignee is: QNX Cooling Systems Inc. (and not QNK Cooling Systems Inc. as currently listed).

Signed and Sealed this

Fifth Day of February, 2008

JON W. DUDAS
*Director of the United States Patent and Trademark Office*